(No Model.)
W. J. LANE.
WHEEL FOR DOOR HANGERS.
No. 422,305.  Patented Feb. 25, 1890.
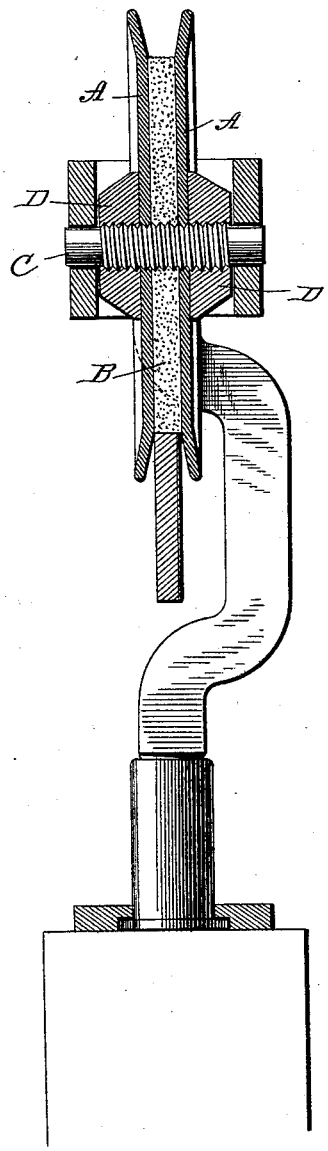
Attest
Walter Donaldson
Walter P. Keene.
Inventor
Wm J. Lane
by Ellis Spear
Atty.

UNITED STATES PATENT OFFICE.

WILLIAM J. LANE, OF POUGHKEEPSIE, NEW YORK.

WHEEL FOR DOOR-HANGERS.

SPECIFICATION forming part of Letters Patent No. 422,305, dated February 25, 1890.

Application filed November 12, 1889. Serial No. 329,986. (No model.)

*To all whom it may concern:*

Be it known that I, WILLIAM J. LANE, of Poughkeepsie, in the county of Dutchess and State of New York, have invented a new and useful Improvement in Wheels; and I do hereby declare that the following is a full, clear, and exact description of the same.

My invention is an improvement in wheels or sheaves, and is designed specially for use in connection with a door-hanger. It is applicable, however, to other uses, and I do not limit myself, therefore, to the special use referred to.

The object of the invention is to provide a wheel with a noiseless tread, this being specially desirable where such wheels are used in connection with the hangers of doors in dwellings; and a second object is to produce such a wheel in an economical manner.

The invention consists of a wheel made of two disks of metal with an interposed disk of flexible material serving as the tread of a wheel, the said flexible material being clamped between the two disks. Further, it consists of two disks of metal having the interposed flexible disks with a pin passing through the three disks and serving as the axle of the wheel, with screw-threaded collars adapted to screw-threads on the pin, whereby the disks are securely clamped against the interposed flexible material.

In the drawing, the figure is a section taken through the center of the wheel longitudinally of the axle.

This wheel is composed of two disks A, of metal, formed of dish shape, their peripheries flaring outwardly. Between two disks thus formed I place a disk of rubber B, or some flexible material—such as rubber and a fibrous material mixed—this interposed disk being of less diameter than the diameter of the metal disk, and thus in use the disk forms the tread of the wheel, while the projecting peripheries of the metal disk prevent derailment. A pin C, which serves as the axle of the wheel, passes through the disks, being provided with screw-threads on its periphery, and in order to clamp the disks securely together I take a screw-threaded collar D, adapted to the threads on the pin, and screw one on each end of the pin until they bear snugly against the faces of the disk, thus clamping them closely against the interposed disk and compressing the same with any degree of pressure desired. The periphery of the pin may then be reduced to the diameter required for the journal of the wheel to the face of the threaded washer.

It will be understood that, if desired, the axle may be provided in the first place with a central threaded portion and the reduced outer portions adapted to serve as the journals of the wheel instead of subsequently reducing the axle, as above described.

I claim as my invention—

1. A wheel or sheave composed of two metallic disks, with an interposed disk of flexible material clamped between the outer disks, said flexible disk being of less diameter than the outer disks, substantially as described.

2. A wheel or sheave consisting of two metallic disks, an interposed flexible disk, a screw-threaded axle, and threaded washers adapted to said axle to clamp the disks together, substantially as described.

In testimony whereof I have signed my name to this specification in the presence of two subscribing witnesses.

WILLIAM J. LANE.

Witnesses:
GEO. H. SHERMAN,
E. M. MEEKS.